US008892555B2

(12) United States Patent
Jeong et al.

(10) Patent No.: US 8,892,555 B2
(45) Date of Patent: Nov. 18, 2014

(54) APPARATUS AND METHOD FOR GENERATING STORY ACCORDING TO USER INFORMATION

(75) Inventors: Hee-Seok Jeong, Suwon-si (KR); Young-Hee Park, Seoul (KR); Jeong-Won Cha, Changwon-si (KR)

(73) Assignees: Samsung Electronics Co., Ltd., Suwon-si (KR); Changwon National University, Industry Academy Cooperation Corps, Changwon-si (KR)

( * ) Notice: Subject to any disclaimer, the term of this patent is extended or adjusted under 35 U.S.C. 154(b) by 29 days.

(21) Appl. No.: 13/436,441

(22) Filed: Mar. 30, 2012

(65) Prior Publication Data

US 2012/0254255 A1 Oct. 4, 2012

(30) Foreign Application Priority Data

Mar. 31, 2011 (KR) .................. 10-2011-0029154
Jun. 8, 2011 (KR) .................. 10-2011-0055102

(51) Int. Cl.
*G06F 7/00* (2006.01)
*G06F 17/30* (2006.01)

(52) U.S. Cl.
CPC .................. *G06F 17/30539* (2013.01)
USPC ........................................ 707/736

(58) Field of Classification Search
USPC ........................................ 707/736
See application file for complete search history.

(56) References Cited

U.S. PATENT DOCUMENTS

2009/0210516 A1* 8/2009 Roskowski ............ 709/219
2010/0114574 A1* 5/2010 Liu et al. ............... 704/251
2012/0054190 A1* 3/2012 Peters ..................... 707/741

* cited by examiner

*Primary Examiner* — Truong Vo

(57) ABSTRACT

An apparatus and method summarize a user's daily life information. The apparatus includes an information collection unit, an analysis unit, a story generator, and a display unit. The information collection unit collects log information including user's daily life information, from at least one electronic device. The analysis unit analyzes the log information collected from the information collection unit and decides at least one topic representing the user's daily life information. The story generator generates at least one sentence representing the user's daily life information using the at least one topic decided in the analysis unit. The display unit displays the at least one sentence generated in the story generator.

20 Claims, 9 Drawing Sheets

APPARATUS AND METHOD FOR GENERATING STORY ACCORDING TO USER INFORMATION

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Mar. 31, 2011 and assigned Serial No. 10-2011-0029154, in the Korean Intellectual Property Office on Jun. 8, 2011 and assigned Serial No. 10-2011-0055102, the contents of which are herein incorporated by reference.

TECHNICAL FIELD OF THE INVENTION

The present disclosure relates to an apparatus and method for generating a story according to user information. More particularly, the present invention relates to an apparatus and method for summarizing, into a story, user's life information according to user information collected from at least one electronic device, and providing the story to a user.

BACKGROUND OF THE INVENTION

With the development of wired/wireless technologies, it made possible to continuously collect information related to a user's daily life. For example, due to the development of mobile communication technologies, a user always carries a mobile device. According to this, the mobile device can collect a variety of information of user's call record, photograph, music file play, position information and the like.

As described above, a mobile device always carried by a user can collect user's daily life information. In this situation, the mobile device can provide the user with a variety of services on the basis of the collected user's daily life information.

However, a current mobile device does not provide a service considering a user's convenience on the basis of the user's daily life information. According to this, there is a need for a technology for summarizing user's life information into a story on the basis of user's daily life information and providing the story to a user in a mobile device.

SUMMARY OF THE INVENTION

To address the above-discussed deficiencies of the prior art, it is an object of the present disclosure to provide at least the advantages below. Accordingly, one aspect of the present disclosure is to provide an apparatus and method for generating a story according to user information collected in at least one electronic device.

Another aspect of the present disclosure is to provide an apparatus and method for generating a story according to user information collected from at least one electronic device and providing the story to a user.

A further aspect of the present disclosure is to provide an apparatus and method for generating a story by time according to user information collected from at least one electronic device.

Yet another aspect of the present disclosure is to provide an apparatus and method for generating a story by topic according to user information collected from at least one electronic device.

The above aspects are achieved by providing an apparatus and method for generating a story according to user information.

According to one aspect of the present disclosure, an apparatus for summarizing user's daily life information is provided. The apparatus includes an information collection unit, an analysis unit, a story generator, and a display unit. The information collection unit collects log information including user's daily life information, from at least one electronic device. The analysis unit analyzes the log information collected from the information collection unit and decides at least one topic representing the user's daily life information. The story generator generates at least one sentence representing the user's daily life information using the at least one topic decided in the analysis unit. The display unit displays the at least one sentence generated in the story generator.

According to another aspect of the present disclosure, a method for summarizing user's daily life information is provided. The method includes collecting log information comprising user's daily life information, from at least one electronic device, analyzing the log information collected from the information collection unit and deciding at least one topic representing the user's daily life information, generating at least one sentence representing the user's daily life information using the at least one topic decided in the analysis unit, and displaying the generated at least one sentence.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
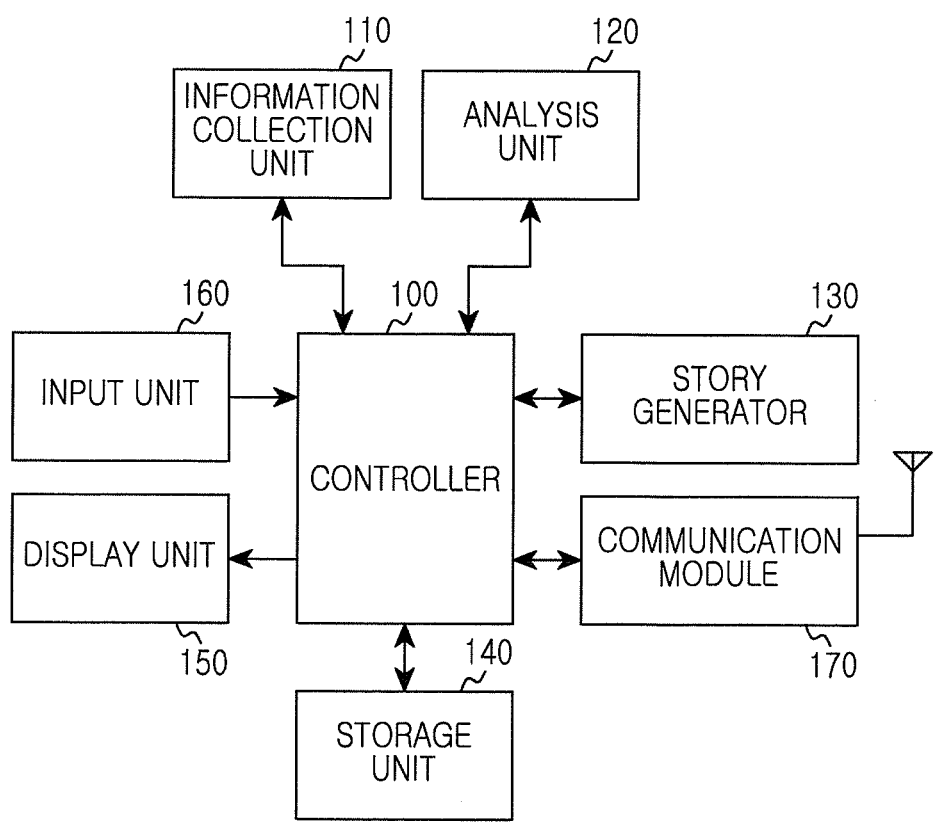
FIG. 1 illustrates a block diagram of a story generating apparatus according to user information according to an exemplary embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Below, the present disclosure describes a technology for summarizing, into a story, user's life information according to user information collected from at least one electronic device and providing the story to a user.

In the following description, a story generating apparatus collects user's daily life information and, on the basis of the collected daily life information, generates a story summarizing user's life information.

The following description assumes that the story generating apparatus is constructed as a portable phone. However, the story generating apparatus can be constructed as any one of a computer capable of processing data, a digital camera, a digital home electronic appliance, a digital phone, a digital projector, home server, a digital video recorder, a digital satellite broadcasting receiver, a set-top box, and a digital Television (TV) broadcasting receiver.

FIG. 1 illustrates a construction of a story generating apparatus according to user information according to an exemplary embodiment of the present disclosure.

As illustrated in FIG. 1, the story generating apparatus includes a controller 100, an information collection unit 110, an analysis unit 120, a story generator 130, a storage unit 140, a display unit 150, an input unit 160, and a communication module 170.

The controller 100 controls the general operation of the story generating apparatus. The controller 100 controls to display a story provided from the story generator 130, on the display unit 150.

The information collection unit 110 collects user's daily life information using log data of at least one electronic device. For example, the information collection unit 110 collects user's daily life information using data received from the external, data generated in the internal, and data stored in an external storage. Here, the data received from the external includes weather, latitude/longitude information, blog information, social data and the like. The data generated in the internal includes a call record, a Short Message Service (SMS), a Multimedia Message Service (MMS), latitude/longitude information measured in a Global Positioning System (GPS), a schedule, an address book and the like. The data stored in the external storage includes an image capture video, a list of played music files, TV viewing information and the like.

Figure 2:
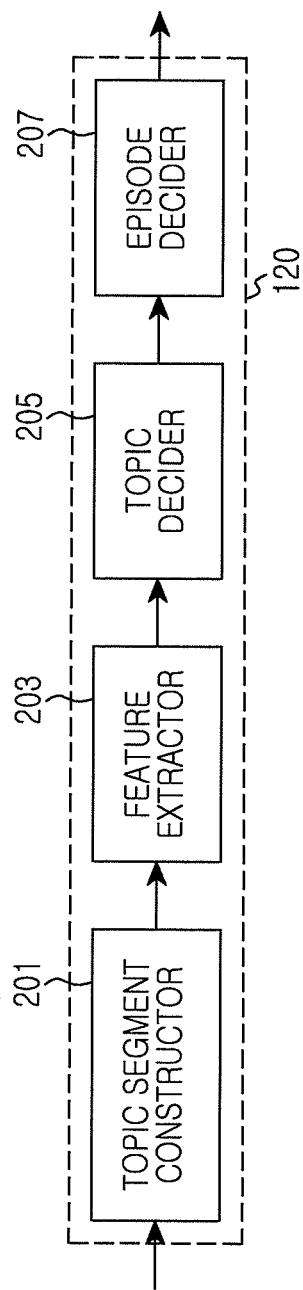
FIG. 2 illustrates a block diagram of an analysis unit of a story generating apparatus according to an exemplary embodiment of the present disclosure.

The analysis unit 120 analyzes information collected by the information collection unit 110 and estimates an episode for representing user's daily life information. For example, the analysis unit 120 is constructed as illustrated in FIG. 2 below.

The story generator 130 generates a story summarizing and expressing user's daily life information using an episode estimated in the analysis unit 120. For example, the story generator 130 generates a story by time using the episode estimated in the analysis unit 120. For another example, the story generator 130 may generate a story by topic using the episode estimated in the analysis unit 120. At this time, the story generator 130 can generate a story of a form different from that of an extracted feature, using a synonymous verb. Also, the story generator 130 may generate a story considering a user's age and area and the like.

The storage unit 140 can be composed of a program storage unit for storing a program for controlling an operation of the story generating apparatus and a data storage unit for storing data that is generated during program execution. For instance, the storage unit 140 stores user schedule information collected from the information collection unit 110, in a form of Table 1 below.

TABLE 1

| Data1 | Data2 | Type | Type-detail | Data1 | Data2 | Data3 | Data4 | Data5 | Data6 |
|---|---|---|---|---|---|---|---|---|---|
| 1318813200000 | 1318816800000 | A | 0 | OS class | #110, 55th building, Changwon National University | Taking OS class till 11 o'clock in #5511 | | | |
| 1318825080000 | 1318825080000 | T | 0 | Lotteria before school. Wait for friend . . . Hamburger is delicious~ | 0.0 0.0 | | Sarim-dong, Changwon-si, Korea | | |
| 1318824360000 | 1318824360000 | S | 2 | 01051141415 | If bored, stay in Lotteria aside. Wait indoors. | | | | |
| 1289809757249 | 1289809757249 | W | 0 | Sunny | Changwon-si | | | | |
| 1289780978000 | 1289780978000 | P | 0 | 35.25032446 128.60073712 | Guam 2-dong, Masan-si, Republic of Korea | | | | |
| 1289831348000 | 1289831348000 | G | 0 | 35.23971670 128.69623801 | Yong-dong Changwon-si, Republic of Korea | /sdcard/DCIM/Camera/2010-11-17 22.59.30.jpg | | | |
| . . . | . . . | . . . | . . . | . . . | . . . | . . . | . . . | . . . | . . . |

According to the control of the controller 100, the display unit 150 displays state information of the story generating apparatus, a menu screen, and story information. For example, according to the control of the controller 100, the display unit 150 displays a story generated in the story generator 130 such that a user can identify the story.

The input unit 160 provides input data generated by user's selection, to the controller 100.

The communication module 170 processes a signal transmitted/received through an antenna for the sake of voice and data communication.

In the aforementioned construction, the controller 100 can perform the functions of the information collection unit 110, the analysis unit 120, and the story generator 130. These are separately constructed for the sake of distinguishing and describing respective functions in the present disclosure. Thus, in actual realization, construction can be such that all or some functions of the information collection unit 110, the analysis unit 120, and the story generator 130 are processed in the controller 100.

FIG. 2 illustrates a detailed construction of an analysis unit of a story generating apparatus according to an exemplary embodiment of the present disclosure.

As illustrated in FIG. 2, the analysis unit 120 includes a topic segment constructor 201, a feature extraction unit 203, a topic decider 205, and an episode decider 207.

The topic segment constructor 201 constructs a topic segment, which is a set of candidate topics for constructing a story, using user schedule information collected in the information collection unit 110. For example, the topic segment constructor 201 separates main events into time durations and constructs a topic segment by a main event included in each time duration. In an example where schedule information is a main event, the topic segment constructor 201 constructs each topic segment by each schedule information. After that, the topic segment constructor 201 maps each assistance event to a corresponding topic segment in consideration of a time of occurrence of each assistance event and a time duration of the topic segment. In an example where there is no topic segment to map an assistance event, the topic segment constructor 201 constructs a base segment using the assistance event mapped to no topic segment. At this time, a time duration of the base segment is preset. For instance, the base segment is constructed at an interval of one hour. Here, the main event represents schedule information becoming a subject constructing a story among the user schedule information collected in the information collection unit 110. The assistance event represents information excepting the main event among the user schedule information collected in the information collection unit 110.

Figure 3:
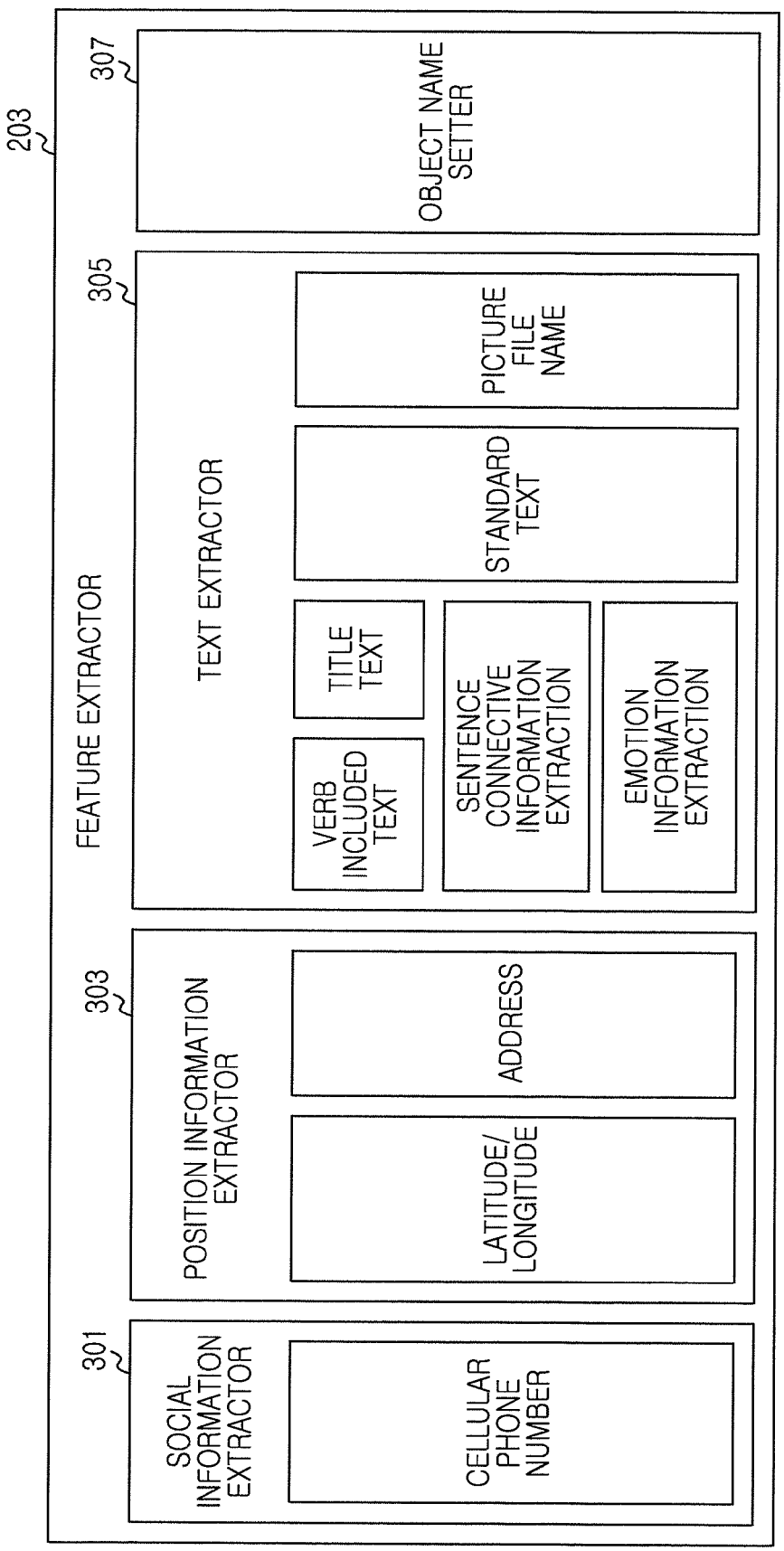
FIG. 3 illustrates a block diagram of a feature extraction unit of a story generating apparatus according to an exemplary embodiment of the present disclosure.

The feature extraction unit 203 extracts a feature from a main event and assistance event included in a topic segment constructed in the topic segment constructor 201. That is, the feature extraction unit 203 extracts a feature from each topic segment. For instance, the feature extraction unit 203 is constructed as illustrated in FIG. 3 below and extracts a feature. Here, the feature represents data capable of becoming a sentence constituent element. For example, the feature includes a verb capable of becoming a sentence constituent element, an object name, sentence connection information, topic information related to the object name, and additional information. At this time, the object name can be different according to at least one of a classification, an object name recognizer, and a sentence template, but may be only an object name defined in a configuration of Table 2 below.

TABLE 2

| Object name | Tag info. | Detailed info. |
|---|---|---|
| Additional feature | EXT_NONE | Additional feature recognition tag, use within system without being actually used as object name |
| Person | PERSON | |
| Organization name | ORG | |
| Day | DAY | |
| Time | TIME | |
| Location name | LOCATION | |
| Object | OBJECT | Event name, object |
| Picture file name | JPEG-FILENAME | Picture filename of JPEG form |

The topic decider 205 decides a topic using features that the feature extraction unit 203 extracts from each topic segment. For example, the topic decider 205 decides a topic considering a probability of occurrence of the topic as in Equation 1 below. At this time, the topic decider 205 decides a topic in each topic segment.

$$T^* = \arg\max_{t \in T} S_t \quad (1)$$

In Equation 1 above, the 'T*' represents an optimal topic within a topic segment, the 'T' represents a set of the total topics, and the '$S_t$' represents a topic score for a topic (t). Here, the topic score ($S_t$) for the topic (t) can be expressed in Equation 2 below.

$$S_t = \sum_{x=L} W_x \cdot \Phi(x, t)$$

$$\Phi(x, t) = P(\text{word}) + P(\text{exts}) \quad (2)$$

In Equation 2 above, the '$S_t$' represents a topic score for a topic (t), the 'L' represents the kind of logs included in a topic segment, the '$W_x$' represents a weight for a corresponding log type, the 'P (word)' represents a probability of occurrence of a word related to a corresponding topic, and the 'P (exts)' represents a characteristic of an additional feature.

The episode decider 207 selects an optimal topic segment at each time zone. At this time, the episode decider 207 recognizes a topic of the optimal topic segment as an episode of a corresponding time.

In an example where a plurality of topic segments exist within the same time duration, the episode decider 207 compares topic scores of topics for each topic segment decided in the topic decider 205 with each other and selects an optimal topic segment of a corresponding time duration.

If topics of continuous topic segments are the same as each other, the episode decider 207 merges the continuous topic segments into one topic segment.

The episode decider 207 decides a main topic being able to represent the most significant feature of user schedule information, in consideration of an episode of each time duration. For example, the episode decider 207 decides a main topic as in Equation 3 below.

$$T^{**} = \arg\max_{t \in T} \left( \sum_{x=EP} d \cdot S_t \right) \quad (3)$$

In Equation 3 above, the 'T**' represents a main topic, the 'T' represents a set of the total topics, the 'EP' represents an episode of each time duration, the 'd' represents a length of the episode, and the '$S_t$' represents a topic score for a topic (t).

The episode decider 207 may estimate a user's emotion considering a probability of occurrence of an emotion word identified in a process of deciding an episode of each time duration.

FIG. 3 illustrates a detailed construction of a feature extraction unit of a story generating apparatus according to an exemplary embodiment of the present disclosure.

As illustrated in FIG. 3, the feature extraction unit 203 includes a social information extractor 301, a position information extractor 303, a text extractor 305, and an object name setter 307.

The social information extractor 301 extracts social information such as cellular phone information, group information and the like, from a main event and assistance event included in each topic segment constructed in the topic segment constructor 201.

The position information extractor 303 extracts position information such as a latitude/longitude, an address, and a place name, from a main event and assistance event included in each topic segment constructed in the topic segment constructor 201. For example, the position information extractor 303 sets the extracted address information as an object name 'LOCATION'.

The position information extractor 303 extracts distance information. Here, the distance information includes a movement distance of the story generating apparatus, a distance to a destination for moving and the like.

The text extractor 305 extracts a feature from text information of a main event and assistance event included in each topic segment constructed in the topic segment constructor 201. For example, the text extractor 305 performs verb-included text extraction, title text extraction, standard text extraction, file name extraction, sentence connection information extraction, and emotion information extraction, using an object name recognizer.

In an example of the verb-included text extraction, the text extractor 305 identifies if a word included in a text is included in a noun dictionary. At this time, after the text extractor 305 removes a postposition included in the corresponding word, the text extractor 305 identifies if the word from which the postposition is removed is included in the noun dictionary.

In an example where it is identified that the word is included in the noun dictionary, the text extractor 305 identifies an object name of the word. For example, the text extractor 305 identifies an object name of the recognized word using an object name dictionary such as Table 3 below.

TABLE 3

| Noun | Object name | Topic |
|---|---|---|
| Bicycle | OBJECT | |
| Festival | OBJECT | Viewing, festival |
| Station | LOCATION | Travel, business |
| Friend | PERSON | Life, picnic |
| Blackboard | | Class |
| Home | LOCATION | |
| ... | ... | ... |

To reduce a size of the noun dictionary, the text extractor 305 can construct a separate object name pattern dictionary including nouns having a constant pattern as in Table 4 below.

TABLE 4

| Noun | Object name | Topic |
|---|---|---|
| ~library | LOCATION | Study, exam/license |
| ~reading room | LOCATION | Study, exam/license |
| ~academy | LOCATION | Study, exam/license |
| ~art museum | LOCATION | Viewing, picture |
| ~exhibition place | LOCATION | Viewing, picture |

TABLE 4-continued

| Noun | Object name | Topic |
|---|---|---|
| ~school | LOCATION | Class, festival, presentation |
| ~college | LOCATION | Class, festival, presentation |
| ~university | LOCATION | Class, festival, presentation |
| ~game | OBJECT | Athletics competition |
| ~arboretum | LOCATION | Travel |
| ~theater | LOCATION | Viewing |
| ~atelier | LOCATION | Picture |
| ~restaurant | LOCATION | Anniversary |
| ~cake | OBJECT | Anniversary |
| ~keik | OBJECT | Anniversary |
| ~insurance | OBJECT | Finance |
| ~installment savings | OBJECT | Finance |
| ~stock | OBJECT | Finance |
| ~bank | LOCATION | Finance |
| ~insurance company | LOCATION | Finance |
| baken~ | OBJECT | Cooking |
| fried~ | OBJECT | Cooking |
| seasoned~ | OBJECT | Cooking |
| roasted~ | OBJECT | Cooking |
| boiled~ | OBJECT | Cooking |
| spice~ | OBJECT | Cooking |
| crushed~ | OBJECT | Cooking |
| mixed~ | OBJECT | Cooking |
| Coated~ | OBJECT | Cooking |
| julienned~ | OBJECT | Cooking |
| chopped~ | OBJECT | Cooking |
| tossed~ | OBJECT | Cooking |
| pot~ | OBJECT | Cooking |
| ~bowl | OBJECT | Cooking |
| ~chopping | OBJECT | Cooking |
| ~topping rice | OBJECT | Cooking |
| ~cooking | OBJECT | Cooking |
| ~stew | OBJECT | Cooking |
| ~meat | OBJECT | Cooking |
| ~rib | OBJECT | Cooking |
| ~recipe | OBJECT | Cooking |
| ~studio | LOCATION | Photo |
| ~photographer | OBJECT | Photo |
| ~lens | OBJECT | Photo |
| ~animal | LOCATION | Pet animal |
| pet~ | LOCATION | Pet animal |
| ~finger | OBJECT | Pain |
| ~ligament | OBJECT | Pain |

In an example of using the object name pattern dictionary such as Table 4 above, if it is identified that the word is not included in the noun dictionary, the text extractor 305 identifies if the word is included in the object name pattern dictionary.

If it is identified that the word is not included in the noun dictionary and the object name pattern dictionary, the text extractor 305 identifies if the word is included in a verb dictionary or a verb conjugation pattern dictionary. For example, the verb dictionary is constructed as in Table 5 below. In table 5, we provide English translation of Korean characters and words in ( ) for reference.

TABLE 5

| Topic | Verb | Synonyms | tmplKey |
|---|---|---|---|
| Study | 전해주 (Jeonhaeju)(corresponding to 'give') | 건네주 (Geonnaeju) (corresponding to 'provide') | 1 |
| Study | 건내주 (Geonnaeju) (corresponding to 'provide') | 전해주 (Jeonhaeju) (corresponding to 'give') | 2 |
| Entrance exam/employment | 집합하 (Jibhabha)(corresponding to 'gather') | 소집하 (Sojibha)(corresponding to 'call') | 3 |
| Travel | 집합하 (Jibhabha)(corresponding to 'gather') | 소집하 (Sojibha(corresponding to 'call') | 3 |
| Physical education | 집합하 (Jibhabha)(corresponding to 'gather') | 소집하 (Sojibha)(corresponding to 'call' | 3 |
| Entrance exam/employment | 통과하 (Tonggwaha) (corresponding to 'enter') | 불합격하 (Boot, Habgyeokha)(corresponding to 'pass') | 4 |
| ... | ... | ... | ... |

For another example, the verb conjugation pattern dictionary is constructed as in Table 6 below. In table 6, we provide English translation of Korean characters and words in ( ) for reference.

TABLE 6

| Verb conjugation pattern | Original pattern |
|---|---|
| ~가 (ga) (corresponding to 'is', 'are') | ~이 (i)~그 (geu) (corresponding to 'be') |
| ~갔었어 (gasseosseo)(corresponding to 'went') | 가 (ga) (corresponding to 'go') |
| ~시켰나 (sikyeossna(corresponding to 'let') | ~시키 (siki) (corresponding to 'let') |
| ~울까 (ulgga)(corresponding to 'cried') | ~우 (u) (corresponding to 'cry') |
| ~왔지 (wassji) (corresponding to 'came') | ~오 (o) (corresponding to 'come') |
| ~혔다는 (hyeossdaneun)(corresponding to 'did') | ~히 (hi)(corresponding to 'do') |
| ... | ... |

Here, the "~i" represents that "~geu" can be used in several patterns.

In an example of the title text extraction, the text extractor 305 identifies if a word included in a title text is included in the noun dictionary. If it is identified that the word is included in the noun dictionary, the text extractor 305 confirms an object name of the word.

In an example of the verb-included text extraction and title text extraction as above, the text extractor 305 identifies if a verb is included in a recognized object name. If it is identified that the verb is not included in the recognized object name, the text extractor 305 adds a basic verb to the object name.

In an example of the sentence connection information extraction, the text extractor 305 extracts sentence connection information from a main event and assistance event included in each topic segment constructed in the topic segment constructor 201. At this time, the text extractor 305 extracts the sentence connection information using a sentence connective verb ending dictionary such as Table 7 below. In table 6, English translation of Korean characters and words is provided in ( ) for reference.

In an example where a sentence of "Cheol-Suwa Yeong-Huiga jibe gassgo, Yeong-Minido gachi jibe gassda" (corresponding to "Cheol-Su and Yeong-Hui go home together with Yeong-Min") exists, the text extractor 305 identifies that the sentence is a complex sentence of a form in which both sentences of "Cheol-Suwa Yeong-Huiga jibe gassda" (corresponding to "Cheol-Su and Yeong-Hui went home") and "Yeong-Minido gachi jibe gassda (corresponding to "together with Yeong-Min")" are combined by an verb ending "go". At this time, the text extractor 305 additionally identifies information that the key "gassgo (the original form: "ga")" and the key "(gassda) (the original form: "ga")" are of a combination form.

In an example of the emotion information extraction, the text extractor 305 extracts emotion information from a main event and assistance event included in each topic segment constructed in the topic segment constructor 201. At this time, the text extractor 305 extracts the emotion information using an emotion dictionary of Table 8 below. In table 8, English translation of Korean characters and words provided in ( ) for reference.

TABLE 7

| Key | Connection name |
| --- | --- |
| ~고 (go), ~며 (myeo), ~고서 (goseo), ~다 (da)/~다가 (daga), ...(corresponding to 'and', 'and then', 'and with ~ing', 'while ~ing' ...) | Combination form |
| ~거나 (geona), ~든지 (deunji), ~든가 (deunga), ~나 (na), ...(corresponding to 'or', 'either ~or', 'whether ~or' ...) | Separation form |
| ~나 (na), ~건만 (geonman), ~나마 (nama), ~되 (doe), ...(corresponding to 'but', 'though', ...) | Opposition |
| ~므로 (meuro), ~더니 (deoni), ~나니 (nani), ...(corresponding to 'since', 'due to', 'as' ...) | Cause subordination |
| ~면 (myeon), ~더라도 (deorado), ~거든 (geodeun), ~았자 (assja), ...(corresponding to 'if', 'even if', 'in case of', 'even though' ...) | Condition subordination |
| ~러(료대), ~고저(gojeo), ...(corresponding to 'in order to', 'so that', 'so as to', ...) | Purpose/intention subordination |
| ~gojeo, ~myeonseo, ...(corresponding to 'with ~', 'by~' ...) | Method/degree subordination |

TABLE 8

| Emotion related noun/verb | Emotion information |
| --- | --- |
| 기쁘 (Gibbeu)(corresponding to 'glad') | PLEASURE |
| 즐겁 (Jeulgeob)(corresponding to 'happy') | PLEASURE |
| 화나 (Hwana)(corresponding to 'angry') | ANGER |
| 분하 (Bunha(corresponding to 'furious') | ANGER |
| ㅠㅠ (emoticon representing sad feeling) | SADNESS |
| 울 (Ul)(corresponding to 'cry') | SADNESS |
| . . . | . . . |

In an example of the standard text extraction, the text extractor 305 extracts a feature from data of a standard form included in a main event and assistance event included in each topic segment constructed in the topic segment constructor 201. At this time, the text extractor 305 extracts the feature from the data of the standard form, using a standard pattern dictionary of Table 9 below. In table 9, we provide English translation of Korean characters and words in ( ) for reference.

TABLE 9

| Card company | Basic verb | Pattern |
| --- | --- | --- |
| KB card | 지불하다 (jibulhada) (corresponding to 'pay') | 1234|M (month d (day |h:m::\\[KB(?: check|card\\\)  (?:[^]+?)님 (Nim) (corresponding to Mr.) (?:.*?) card ([0-9]?[0-9] month [0-9]?[0-9] day)([0-9]?[0-9]\\:[0-9]?[0-9]) ([0-9,]+) Won ([^]+)used |
| BC/NH card | 지불하다 (jibulhada) (corresponding to 'pay') | 3124|M/d|h:m::\\[(?:.*?) approval \\] ([0-9,]+) Won [^]+ (?:[^]+?)님 (Nim)(corresponding to Mr.)([0-9]?[0-9]\\V[0-9]?[0-9]) ([0-9]?[0-9]\\:[0-9]?[0-9]) ([^]+)$ |
| Shinhan card | 지불하다 (jibulhada) (corresponding to 'pay') | 1243|M month d day|h:m:: Shinhan card (?:[^]+?) ([0-9]?[0-9] month [0-9]?[0-9] day) ([0-9]?[0-9]\\:[0-9]?[0-9]) ([^]+) ([0-9,]+) Won (?:.*?)used |

TABLE 9-continued

| Card company | Basic verb | Pattern |
|---|---|---|
| Samsung card | 지불하다 (jibulhada) (corresponding to 'pay') | 1243\|M/d\|h:m::\\[Samsung card used\\] ([0-9]?[0-9]\\/[0-9]?[0-9]) ([0-9]?[0-9]\\:[0-9]?[0-9]) ([ ̂]+) ([0-9,]+) ([ ̂]+)$ |
| Lotte card | 지불하다 (jibulhada) (corresponding to 'pay') | 3124\|M/d\|h:m:: Lotte card Mr. (?:[ ̂]+?) ([0-9,]+) Won ([ ̂]+) ([0-9]?[0-9]\\/[0-9]?[0-9]) ([0-9]?[0-9]\\:[0-9]?[0-9]) ([ ]+)$ |
| Hana SK card | 지불하다 (jibulhada) (corresponding to 'pay') | 1234\|M/d\|h:m::\\[Hana SK card\\]\\([0-9*]+\\) Mr. (?:[ ̂]+?) ([0-9]?[0-9]\\/[0-9]?[0-9]) ([0-9]?[0-9]\\:[0-9]?[0-9]) ([ ̂/]+)\\/([0-9,]+) Won\\/approval \\/([ ̂]+)$ |
| Hyundai card | 지불하다 (jibulhada) (corresponding to 'pay') | 234\|\|h:m::\\[ Hyundai card[ ̂]]*\\]\\- approval (?:[ ̂]+?)님 (Nim) (corresponding to 'Mr.')([0-9]?[0-9]\\:[0-9]?[0-9]) ([0-9,]+)Won\\([ ])+\\) ([ ]+)$ |
| ... | ... | ... |

In an example of extracting a photograph file name, the text extractor 305 extracts an object name using path information and tag information of a photograph related file included in a main event and assistance event included in each topic segment constructed in the topic segment constructor 201.

The object name setter 307 sets input data as a predefined object name. For example, the object name setter 307 sets data of a file name column among photograph logs, as an object name "OBJECT".

The feature extraction unit 203 identifies the frequency of occurrence of each topic using extracted feature information. For example, among features extracted in the feature extraction unit 203, an object name includes corresponding topic information as in Table 2 above. According to this, the feature extraction unit 203 updates the frequency of occurrence of a topic according to the topic information of the extracted object name. In an example where an address extracted in the position information extractor 303 is "Daehanminguk Jeju-do Seogwipo-si", and the "Jeju-do" and the "Seogwipo-si" are set to a topic 'travel' in the noun dictionary, the feature extraction unit 203 sets the frequency of occurrence of the topic 'travel' by '2'.

The feature extraction unit 203 constructed as above can be varied in structure according to a form of log data. According to this, the construction of the feature extraction unit 203 illustrated in FIG. 3 can be varied according to the form of log data.

A feature extracted in the feature extraction unit 203 constructed as above can be managed in a form of Table 10 below.

TABLE 10

| Structure name | Detailed information |
|---|---|
| Management of main feature | Management of verb and object name capable of becoming sentence constituent element |
| Management of additional feature | Management of feature not capable of becoming sentence constituent element but affecting topic decision |
| Management of sentence connective verb ending | Information of connection relation between verbs |
| Information of frequency of topic by log | Management of frequency information/data necessary for topic decision |

Feature information other than the sentence connective verb ending and the information of the frequency of a topic by log among the features extracted in the feature extraction unit 203 as in Table 10 above are distinguished into a main feature and a sub feature and are managed. For example, features extracted in the social information extractor 301, the position information extractor 303, the text extractor 305 and the object name setter 307 are distinguished into the main feature or the sub feature. For another example, the feature extraction unit 203 may include a feature extraction postprocessor for distinguishing features extracted in the social information extractor 301, the position information extractor 303, the text extractor 305 and the object name setter 307, into a main feature or a sub feature.

As described above, a story generating apparatus analyzes log information collected from at least one electronic device and decides an episode according to user's daily life information. At this time, the story generating apparatus generates a story according to user's daily life information as illustrated in FIG. 4 below.

Figure 4:
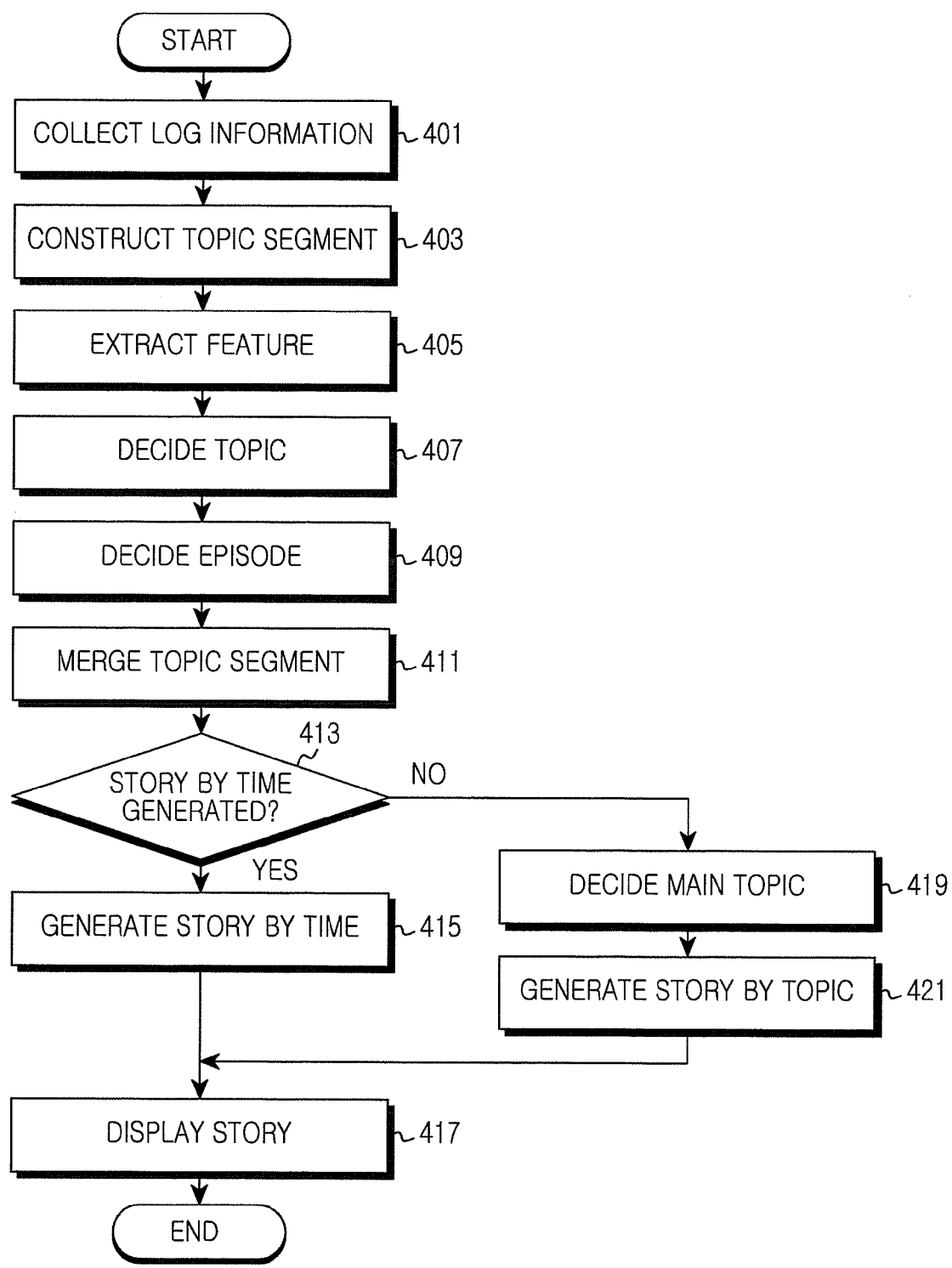
FIG. 4 illustrates a procedure of generating a story according to user information according to an exemplary embodiment of the present disclosure.

FIG. 4 illustrates a procedure of generating a story according to user information according to an exemplary embodiment of the present disclosure.

Referring to FIG. 4, in step 401, the story generating apparatus collects log information from at least one electronic device. For example, the story generating apparatus collects user's daily life information using data received from the external, data generated in the internal, and data stored in an external storage. Here, the data received from the external includes weather, latitude/longitude information, blog information, social data and the like. The data generated in the internal includes a call record, an SMS, an MMS, latitude/longitude information measured in a GPS, a schedule, an address book and the like. The data stored in the external storage includes an image capture video, a list of played music files, TV viewing information and the like.

Figure 5:
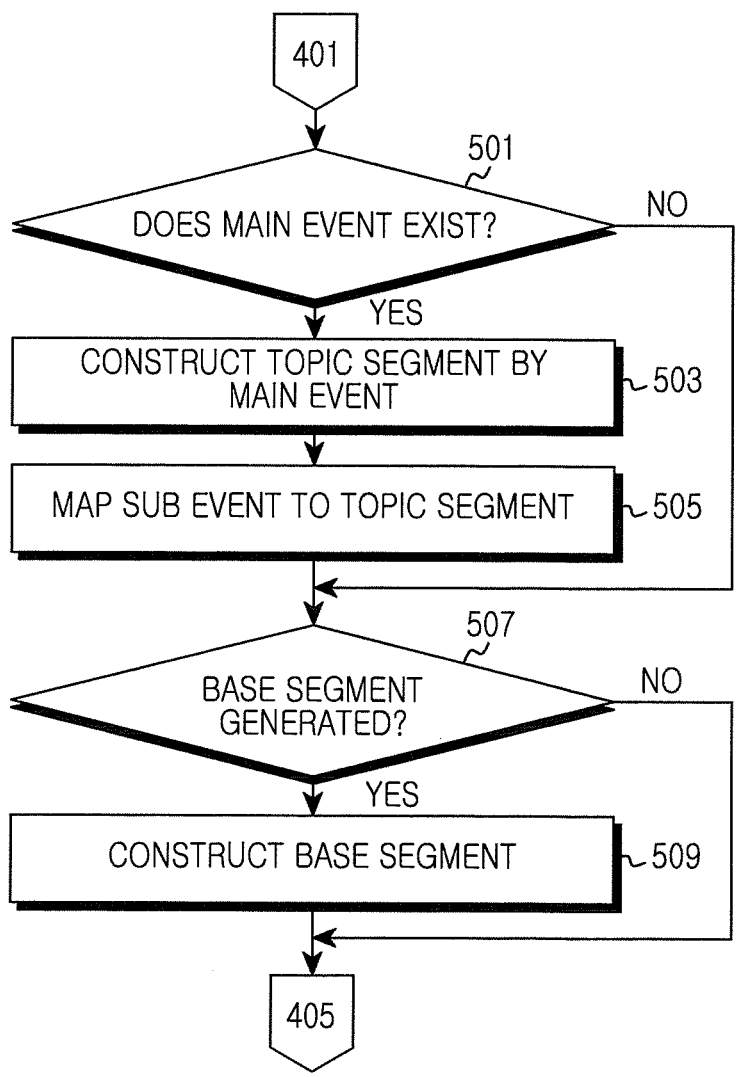
FIG. 5 illustrates a procedure for constructing a topic segment according to an exemplary embodiment of the present disclosure.

After that, the story generating apparatus proceeds to step 403 and constructs a topic segment that is a set of candidate topics for constructing a story, using the collected log information. For example, the story generating apparatus constructs a topic segment as illustrated in FIG. 5 below.

Figure 6:
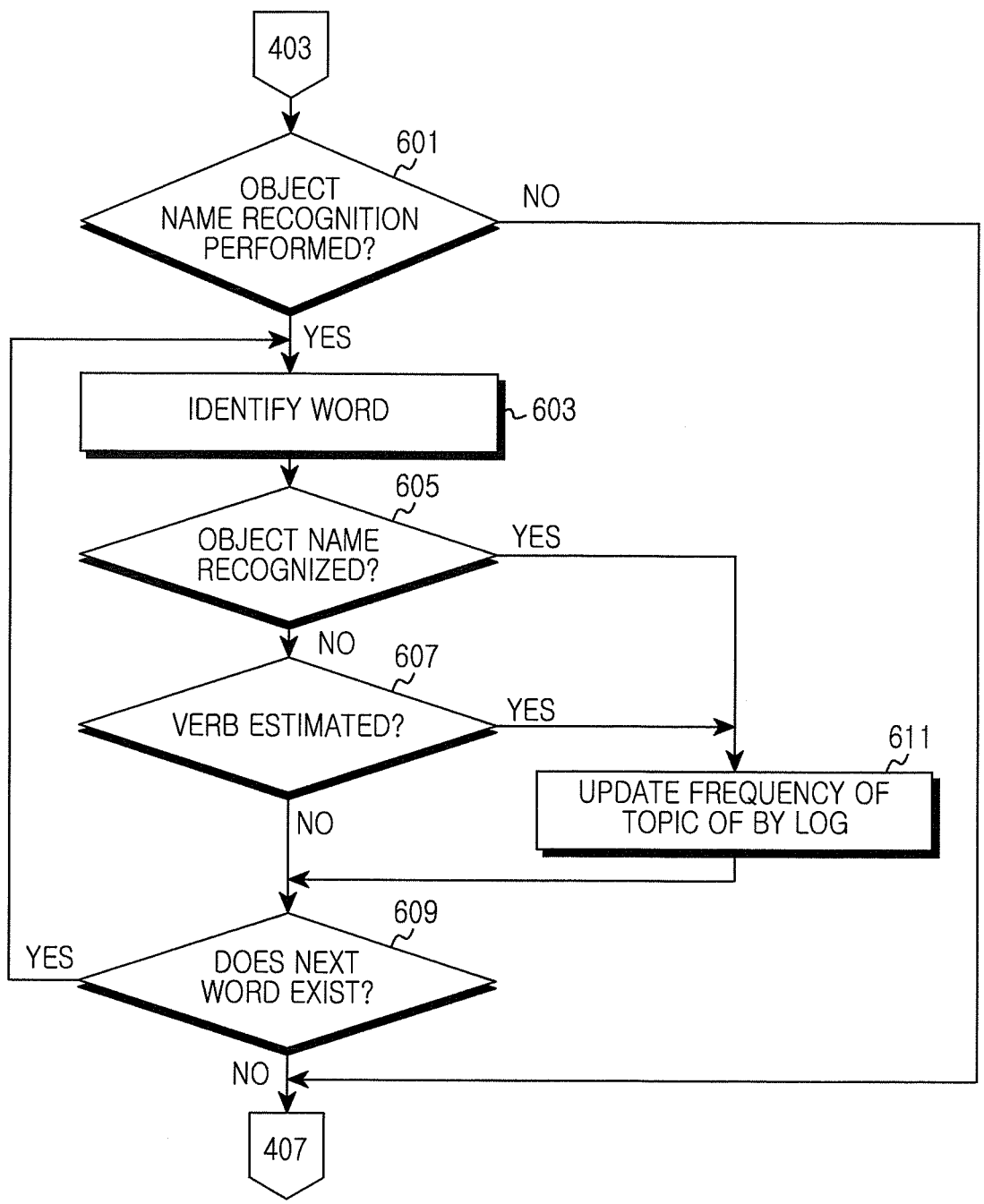
FIG. 6 illustrates a procedure of object recognition according to an exemplary embodiment of the present disclosure.

After constructing the topic segment, the story generating apparatus proceeds to step 405 and extracts a feature from a main event and assistance event of each topic segment. For example, as illustrated in FIG. 6 below, the story generating apparatus extracts a feature from each topic segment using the feature extraction unit 203 constructed in FIG. 3 above. Here, the feature represents data capable of becoming a sentence constituent element. For example, the feature includes a verb capable of becoming a sentence constituent element, an object name, sentence connection information, topic information related to the object name, and additional information.

After extracting the feature from each topic segment, the story generating apparatus proceeds to step 407 and decides a topic for each topic segment in consideration of the frequency of topic occurrence of logs. For example, the story generating apparatus decides a topic of each topic segment using Equation 1 above.

After deciding the topic for each topic segment, the story generating apparatus proceeds to step 409 and decides an optimal topic segment in each time duration. In an example where a plurality of topic segments exist in the same time duration, the story generating apparatus compares topic scores of topics included in each topic segment with each other and selects an optimal topic segment of a corresponding time duration. At this time, the story generating apparatus recognizes a topic of the optimal topic segment as an episode of a corresponding time.

After that, the story generating apparatus proceeds to step 411 and merges the topic segments having the same topic into one topic segment and decides a final episode. In an example where topics of continuous topic segments are the same as each other, the story generating apparatus merges the continuous topic segments into one topic segment. In another example where topics of topic segments of the same time duration are the same as each other, the story generating apparatus merges the topic segments into one topic segment.

After merging the topic segments having the same topic, the story generating apparatus proceeds to step 413 and decides whether to generate a story by time.

Figure 7:
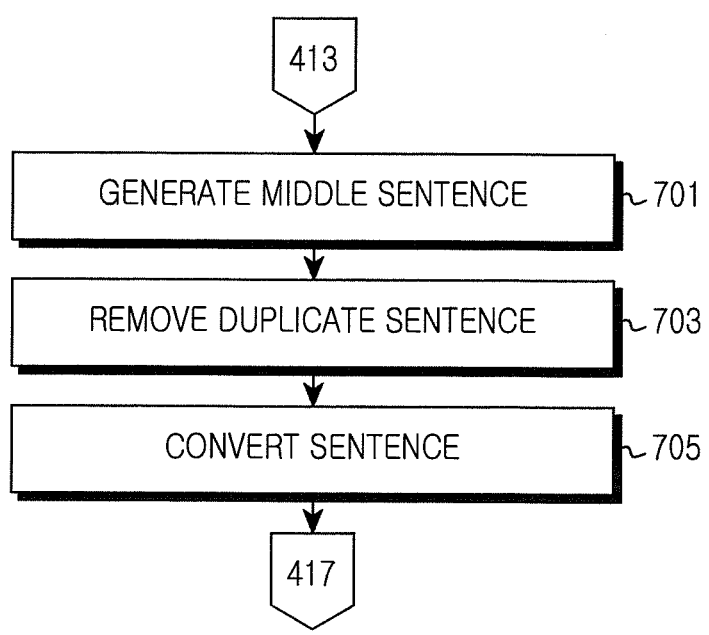
FIG. 7 illustrates a procedure for generating a story by time according to an exemplary embodiment of the present disclosure.

In an example where the story generating apparatus decides to generate the story by time in step 413, the story generating apparatus proceeds to step 415 and generates each story by time using the episode decided in step 409 or step 411. For example, the story generating apparatus generates a story by time as illustrated in FIG. 7 below.

Figure 9A:
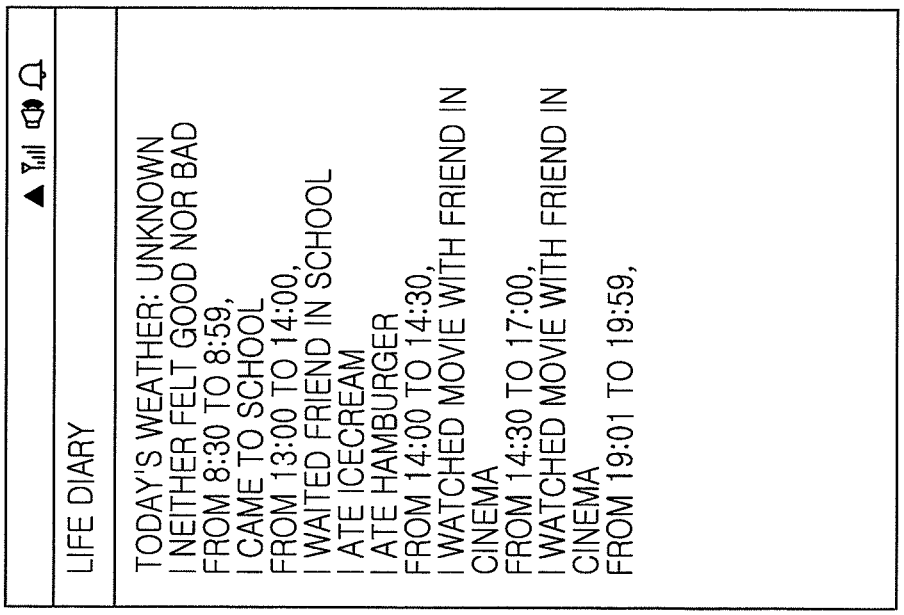
FIGS. 9A and 9B illustrate a diagram a screen of displaying a story according to an exemplary embodiment of the present disclosure.

Next, the story generating apparatus proceeds to step 417 and displays the story generated by time, on a display unit. For example, as illustrated in FIG. 9A, the story generating apparatus displays a story generated by time on the display unit. At this time, the story generating apparatus may output not only a sentence of a text form but also multimedia information related to the sentence together.

In contrast, in an example where the story generating apparatus decides not to generate the story by time in step 413, the story generating apparatus recognizes that it generates a story by topic. According to this, the story generating apparatus proceeds to step 419 and decides a main topic. That is, the story generating apparatus decides a main topic capable of representing the most significant feature of user schedule information, in consideration of an episode of each time duration. For example, the story generating apparatus decides a main topic using Equation 3 above.

Figure 8:
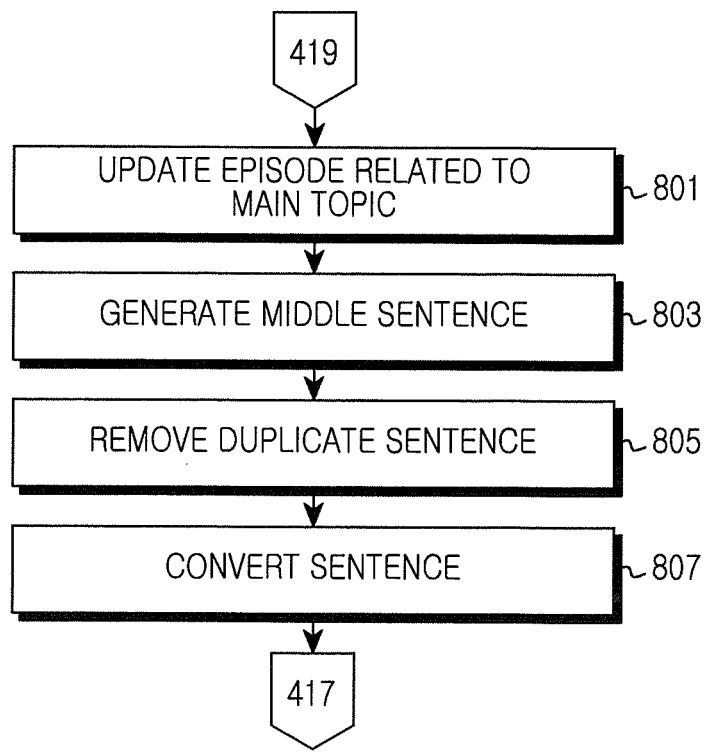
FIG. 8 illustrates a procedure for generating a story by topic according to an exemplary embodiment of the present disclosure.

After deciding the main topic in step 419, the story generating apparatus proceeds to step 421 and merges features within an episode related to the main topic, generating a story related to one main topic. At this time, the story generating apparatus may generate a story related to not only a main topic but also weather and a user's emotion. For example, the story generating apparatus generates a story by topic as illustrated in FIG. 8 below.

Figure 9B:
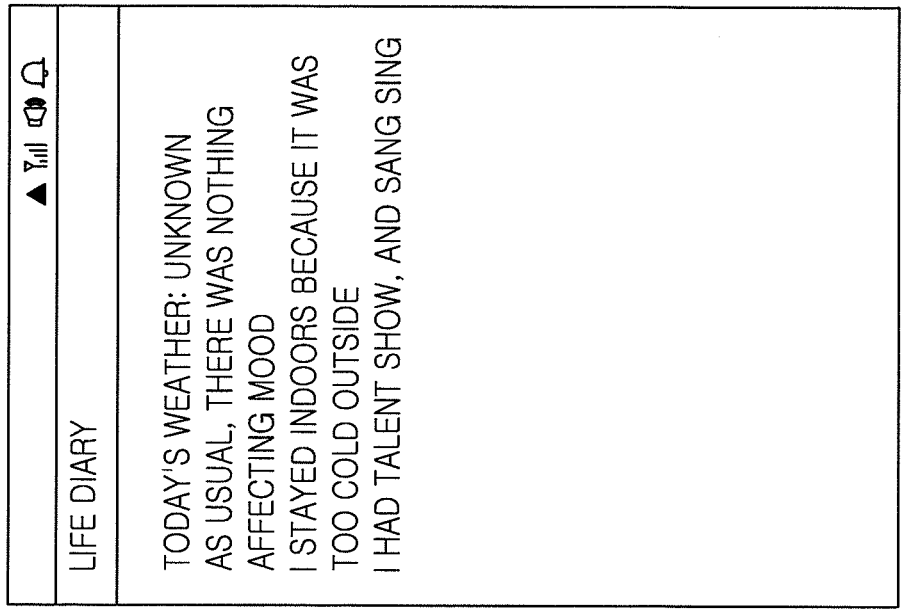

Next, the story generating apparatus proceeds to step 417 and displays the story generated by topic, on the display unit. For example, as illustrated in FIG. 9B, the story generating apparatus displays a story generated by topic, on the display unit. At this time, the story generating apparatus may output not only a sentence of a text form but also multimedia information related to the sentence together.

After that, the story generating apparatus terminates an algorithm according to the exemplary embodiment of the present disclosure.

FIG. 5 illustrates a procedure for constructing a topic segment according to an exemplary embodiment of the present disclosure.

Referring to FIG. 5, after collecting log information in step 401 of FIG. 4, the story generating apparatus proceeds to step 501 and identifies if a main event exists. Here, the main event represents schedule information becoming a subject constructing a story among the collected user schedule information.

In an example where it is identified in step 501 that the main event does not exist, the story generating apparatus jumps to step 507 and identifies whether to generate a base segment.

In contrast, in an example where it is identified in step 501 that the main event exists, the story generating apparatus proceeds to step 503 and constructs a topic segment by the main event. In an example where schedule information is a main event, the story generating apparatus arranges the schedule information in order of time and constructs a topic segment by each schedule information. In an example where a time of occurrence of a main event is overlapped, the story generating apparatus divides topic segments on a basis of a main event of a short time duration. In an example where there is a schedule 'A' from 13 o'clock to 14 o'clock and there is a schedule 'B' from 13 o'clock to 15 o'clock, the story generating apparatus constructs a topic segment for each of the schedule 'A' and the schedule 'B' from 13 o'clock to 14 o'clock. Also, the story generating apparatus constructs a topic segment for the schedule 'B' from 14 o'clock to 15 o'clock.

After constructing the topic segment, the story generating apparatus proceeds to step 505 and, in an example where a time of occurrence of an assistance event is included in a time duration of the topic segment, the story generating apparatus maps the corresponding assistance event to the topic segment. Here, the assistance event represents information excepting the main event in the collected user schedule information.

Next, the story generating apparatus proceeds to step 507 and identifies whether to generate a base segment. For example, the story generating apparatus generates a base segment using an assistance event mapped to no topic segment. According to this, the story generating apparatus identifies if the assistance event mapped to no topic segment exists.

In an example where it is identified that the assistance event mapped to no topic segment does not exist, the story generating apparatus recognizes that it does not generate a base segment. According to this, the story generating apparatus proceeds to step 405 of FIG. 4 and extracts a feature from each topic segment.

In contrast, in an example where it is identified that the assistance event mapped to no topic segment exists, the story generating apparatus proceeds to step 509 and generates a base segment using the assistance event mapped to no topic segment. At this time, the base segment is set to a preset time duration.

After that, the story generating apparatus proceeds to step 405 of FIG. 4 and extracts a feature from each topic segment.

The following description is made for a method for extracting a feature from data of a text form in the text extractor 305.

FIG. 6 illustrates a procedure of object recognition according to an exemplary embodiment of the present disclosure.

Referring to FIG. 6, after constructing a topic segment in step 403 of FIG. 4, the story generating apparatus proceeds to step 601 and decides whether to perform object name recognition using an object name recognizer. For example, the story generating apparatus identifies if a candidate word needing the object name recognition through the object name recognizer exists.

In an example where it is decided not to perform the object name recognition using the object name recognizer in step 601, the story generating apparatus recognizes that the candidate terminal needing the object name recognition does not exist. According to this, the story generating apparatus terminates an algorithm according to the exemplary embodiment of the present disclosure. That is, the story generating apparatus jumps to step 407 of FIG. 4 and decides a topic of each topic segment.

In contrast, in an example where it is decided to perform object name recognition in step 601, the story generating apparatus recognizes that a candidate terminal needing object name recognition exists. According to this, the story generating apparatus proceeds to step 603 and identifies a word to perform the object name recognition. For example, in an example where the story generating apparatus extracts a feature from a text of "Cheol-Suwa Yeong-Huiga jibe gassda" (corresponding to "Cheol-Su and Yeong-Hui went home"), the story generating apparatus identifies the "Cheol-Suwa" (corresponding to "with Cheol-Su") for the sake of object name recognition.

Next, the story generating apparatus proceeds to step 605 and identifies an object name of the word identified in step 603. In an example where the story generating apparatus identifies the object name of "Cheol-Suwa" (corresponding to "with Cheol-Su"), the story generating apparatus removes a postposition "wa" (corresponding to "with"_) from the "Cheol-Suwa" (corresponding to "with Cheol-Su") and then, identifies if the "Cheol-Su" is included in a noun dictionary. In an example where the "Cheol-Su" is not included in the noun dictionary, the story generating apparatus may identify if the "Cheol-Su" is included in an object name pattern dictionary constructed as in Table 4 above.

In an example where it is identified in step 605 that the story generating apparatus identifies the object name of the word identified in step 603, the story generating apparatus proceeds to step 611 and updates the frequency of occurrence of a topic of the recognized object name. In an example where the story generating apparatus identifies an object name 'PERSON' of a word "friend", the story generating apparatus adds, by one, the frequency of occurrence of "life" and "picnic" that are topics of the 'PERSON'.

In contrast, in an example where it is identified in step 605 that the story generating apparatus cannot identify the object name of the word, the story generating apparatus proceeds to step 607 and identifies if the word is included in a verb dictionary or a verb conjugation pattern dictionary.

In an example where it is identified in step 607 that the word is not included in the verb dictionary or the verb conjugation pattern dictionary, the story generating apparatus recognizes that it cannot extract a feature from the word. According to this, the story generating apparatus proceeds to step 609 and identifies if a next word exists.

In an example where it is identified in step 607 that the word is included in the verb dictionary or the verb conjugation pattern dictionary, the story generating apparatus recognizes that it succeeds in verb estimation. According to this, the story generating apparatus proceeds to step 611 and updates the frequency of occurrence of a topic according to verb information.

After that, the story generating apparatus proceeds to step 609 and identifies if a next word exists.

In an example where it is identified in step 609 that the next word does not exist, the story generating apparatus recognizes that it extracts all features. According to this, the story generating apparatus proceeds to step 407 of FIG. 4 and decides a topic of each topic segment.

In contrast, in an example where it is identified in step 609 that the next word exists, the story generating apparatus returns to step 603 and identifies the next word to extract a feature.

Although not illustrated, the story generating apparatus identifies if a verb is included in a recognized object name. In an example where the story generating apparatus extracts nouns "Cheol-Su", "Yeong-Hui", and "jib" (corresponding to "home") and a verb "gassda" (corresponding to "went") from a text of "Cheol-Suwa Yeong-Huiga jibe gassda" (corresponding to "Cheol-Su and Yeong-Hui went home"), the story generating apparatus recognizes that the nouns "Cheol-Su", "Yeong-Hui", and "jib" (corresponding to "home") includes the verb "gassda" (corresponding to "went"). However, in an example where it is identified that a verb is not included in a recognized object name, the story generating apparatus estimates the verb to be added to the object name, in a basic verb dictionary.

FIG. 7 illustrates a procedure for generating a story by time according to an exemplary embodiment of the present disclosure.

Referring to FIG. 7, in an example where the story generating apparatus decides to generate a story by time in step 413 of FIG. 4, in step 701, the story generating apparatus generates a middle sentence for each episode using a main feature of each episode. For example, the story generating apparatus identifies a topic and a verb in the main feature of the episode. After that, the story generating apparatus selects a sentence template corresponding to the topic and verb in Table 11 below. Here, the sentence template represents a sentence form constructed by a specific topic and verb. In table 11, English translation of Korean characters and words is provided in ( ) for reference.

TABLE 11

| Topic | Verb | Synonyms | Sentence template | Obligatory case |
| --- | --- | --- | --- | --- |
| Study | 전해주 (Jeonhaeju) (corresponding to 'give') | 건내주 (Geonnaeju) (corresponding to 'provide') | <DAY><TIME>에 (e) <LOCATION>에서 (eseo) <OBJECT><을 (eul)>/전해 줬 (jeonhaejwoss) | OBJECT |

TABLE 11-continued

| Topic | Verb | Synonyms | Sentence template | Obligatory case |
|---|---|---|---|---|
| Study | 건네주 (Geonnaeju) (corresponding to 'provide') | 전해주 (Jeonhaeju) (corresponding to 'give') | <DAY><TIME>에 (e) <LOCATION>에서 (eseo) <OBJECT><을 (eul)>/건네줬 (geonnaejwoss) | OBJECT |
| Entrance exam/ employment, travel, physical education | 집합하 (Jibhabha)(corresponding to 'gather') | 소집하 (Sojibha) (corresponding to 'call') | <ORG> <LOCATION>로 (ro)/집합했 (jibhabhaess) | LOCATION |
| Entrance exam/ employment | 통과하 (Tonggwaha) (corresponding to 'enter') | 불합격하 (But, Habgyeokha) (corresponding to 'pass') | <DAY><TIME>에 (e) <PERSON><이(i)> <OBJECT><을 (eul)>/통과했 (tonggwahaess) | OBJECT |
| Diet | 운동하 (Undongha) (corresponding to 'exercise') | | <DAY><TIME>에 (e) <LOCATION>에서 (eseo) <PERSON><와 (wa)> <OBJECT><으로 (euro)>/운동했 (undonghaess) | |
| $ | 휴일 (Hyuil)) (corresponding to 'holiday') | | 휴일에여자친구와 데이트약속을 잡았다 (Hyuil e yeojachingu wa date yagsog eul jabassda)(corresponding to "I have a date with my girlfriend on holiday") | |
| $ | 분노 (Bunno) (corresponding to 'furious') | | 오늘은 화가나는 일이 있었다 (Oneul eun hwa ga naneun il i isseossda)(corresponding to "I had a thing that makes me angry today") | |
| ... | ... | ... | ... | ... |

In Table 11 above, the first column represents a topic. At this time, the '$' represents a sentence template used for basic sentence generation. The second column represents a verb, and the third column represents a synonymous verb having the same meaning as the verb of the second column while being different in expression scheme only. The fourth column, which is a sentence template, is constructed according to the verb and the topic. The fifth column represents object name information obligatorily needed when the sentence template is used. In an example where a topic of an episode is "Study" and a verb is "jeonhaejuda" (corresponding to "give", the story generating apparatus recognizes, as a middle sentence of a corresponding episode, a sentence templet such as "<DAY> <TIME>e (corresponding to "at") <LOCATION>eseo (corresponding to "in") <OBJECT><eul>/jeonhaejwoss (corresponding to "give")" according to Table 11 above. At this time, the story generating apparatus obligatorily needs any one of the <DAY>, the <TIME>, the <LOCATION> and the <OBJECT>. For example, in an example where the story generating apparatus has to obligatorily have the <OBJECT>, the story generating apparatus obligatorily includes the object name <OBJECT> and generates a middle sentence. If there is not the obligatorily needed object name <OBJECT>, the story generating apparatus does not construct an episode because not meeting a condition for sentence template generation.

Additionally, to provide the variety of sentence generation, the story generating apparatus may generate a middle sentence by a synonymous verb, not a verb of an episode. In an example where a topic of an episode is "Study" and a verb is "jeonhaejuda", the story generating apparatus may recognize a sentence templet such as "<DAY> <TIME>e (corresponding to "at") <LOCATION>eseo (corresponding to "in") <OBJECT><eul>/geonnaejwoss (corresponding to "provide")" as a middle sentence of a corresponding episode, using "geonnaeju" (corresponding to "provide") that is a synonymous verb of the "jeonhaejuda" (corresponding to "give").

After generating the middle sentence for the episode, the story generating apparatus proceeds to step 703 and removes a duplicate sentence. For example, in an example where the story generating apparatus generates two middle sentences "haggyoe/gass/ga" (corresponding to "go school/went school") and "oneul Yeong-Huirang haggyoe/gass/ga" (corresponding to "today, go school/went school with Yeong-Hui"), the story generating apparatus deletes a duplicate sentence "haggyoe/gass/ga" (corresponding to "go school/went school") because the middle sentence "oneul Yeong-Huirang haggyoe/gass/ga" (corresponding to "today, go school/went school with Yeong-Hui") contains the middle sentence "haggyoe/gass/ga".

After removing the duplicate sentence, the story generating apparatus proceeds to step 705 and converts the middle sentence into a sentence of a complete form. That is, the story generating apparatus converts the middle sentence into a sentence of a complete form using verb ending information and sentence connection information. For instance, in an example where two middle sentences "oneul haggyoeseo/siheomchyeoss/siheomchi" (corresponding to "today, go school and take/took test") and "Cheol-Suwa/Nongguhaess/Nongguha" (corresponding to "play golf with Cheol-Su") exist and sentence connection information is of combination, the story generating apparatus connects the two middle sentences as one sentence. At this time, the story generating apparatus selects a sentence connective verb ending to connect the two middle sentences using the sentence connective verb ending dictionary of Table 7 above. After that, the story generating apparatus selects an ending verb, generating a complete sentence "oneul haggyoeseo siheomchyeossgo, Cheol-Suwa/Nongguhaessda" (corresponding to "today, went school and took a test and play golf with Cheol-Su"). At this time, the story generating apparatus can select the ending verb considering at least one of area, gender, and age. In an example where the story generating apparatus sets an ending verb differently by age, the story generating apparatus can select the ending verb using Table 12 below. In table 12, verb-endings are samples used according to age and gender in Korea.

TABLE 12

| Age | Gender | Verb Ending |
| --- | --- | --- |
| 30 or less | Male | 삼 (Sam),어요 (Eoyo),영 (Eong), 쪄요 (Jjyeoyo),어 (Eo),당 (Dang),음 (Eum), 습니다 (Seubmida),답니다 (Dabmida) |
| 30 or less | Female | 쪄요 (Jjyeoyo),영 (Eong),어요 (Eoyo), 당 (Dang),삼 (Sam),어 (Eo),징 (Jing), 답니다 (Dabmida),습니다 (Seubmida), 어용 (Eoyong),네요 (Neyo) |
| 30 or more | Male | 더라구 (Deoragu),네 (Ne),답니다 (Dabmida), 구만요 (Gumanyo),네 (Ne),음 (Eum), 습니다 (Seubmida),다우 (Dau),니라 (Nira) |
| 30 or more | Female | 더라구 (Deoragu),다우 (Dau),구나 (Guna), 어요 (Eoyo),어야지요 (Eoyajiyo), 사옵니다 (Saobmida),네요 (Neyo) |

In contrast, in an example where the story generating apparatus sets an ending verb differently by area, the story generating apparatus can select the ending verb using Table 13 below. In table 13, verb-endings are sample of dialect according to the province in Korea.

TABLE 13

| Loc | Verb Ending |
| --- | --- |
| 강원 (Gangwon) | 다 (Da) |
| 경기 (Gyeonggi) | 다 (Da) |
| 전라 (Jeolla) | 다 (Da),어라 (Eora), 당께 (Dangkke) |
| 충청 (Chungcheong) | 다 (Da),슈 (Syu),어유 (Eoyu) |
| 경상 (Gyeongsang) | 다 (Da), 다아임니꺼 (Daaimmikkeo), 어라에 (Eoraye) |
| 제주 (Jeju) | 다 (Da) |

After converting the middle sentence into the complete sentence in step 705, the story generating apparatus proceeds to step 417 of FIG. 4 and displays, on a display unit, the sentence generated by time such that a user can identify the generated sentence.

FIG. 8 illustrates a procedure for generating a story by topic according to an exemplary embodiment of the present disclosure.

Referring to FIG. 8, after deciding a main topic in step 419 of FIG. 4, in step 801, the story generating apparatus collects features of episodes related to the main topic. In this example, the story generating apparatus merges episodes that has the same topic but has a different time of occurrence of the topic, into one episode.

After that, the story generating apparatus proceeds to step 803 and generates a middle sentence using the collected features. For example, the story generating apparatus identifies a topic and a verb in the collected feature. After that, the story generating apparatus selects a sentence template corresponding to the topic and verb in Table 11 above. In an example where a topic of an episode is "Study" and a verb is "jeonhaejuda", the story generating apparatus recognizes, as a middle sentence of a corresponding episode, a sentence template such as "<DAY> <TIME>e (corresponding to "at") <LOCATION>eseo (corresponding to "in") <OBJECT><eul>/geonnaejwoss (corresponding to "provide")" according to Table 11 above. At this time, the story generating apparatus obligatorily needs any one of the <DAY>, the <TIME>, the <LOCATION> and the <OBJECT>. For example, in an example where the story generating apparatus has to obligatorily have the <OBJECT>, the story generating apparatus obligatorily includes the object name <OBJECT> and generates a middle sentence. If there is not the obligatorily needed object name <OBJECT>, the story generating apparatus does not construct an episode because not meeting a condition for sentence template generation.

Additionally, to provide the variety of sentence generation, the story generating apparatus may generate a middle sentence by a synonymous verb, not a verb of an episode. In an example where a topic of an episode is "Study" and a verb is "jeonhaejuda", the story generating apparatus may recognize a sentence template such as "<DAY> <TIME>e (corresponding to "at") <LOCATION>eseo (corresponding to "in") <OBJECT><eul>/geonnaejwoss (corresponding to "provide")" as a middle sentence of a corresponding episode, using "geonnaeju" (corresponding to "provide") that is a synonymous verb of the "jeonhaejuda".

After generating the middle sentence for the episode, the story generating apparatus proceeds to step 805 and removes a duplicate sentence. For example, in an example where the story generating apparatus generates two middle sentences "haggyoe/gass/ga" (corresponding to "go/went school") and "oneul Yeong-Huirang haggyoe/gass/ga" (corresponding to "today, go/went school with Yeong-Hui"), the story generating apparatus deletes a duplicate sentence "haggyoe/gass/ga" (corresponding to "go/went school") because the middle sentence "oneul Yeong-Huirang haggyoe/gass/ga" (corresponding to "today, go/went school with Yeong-Hui") contains the middle sentence "haggyoe/gass/ga" (corresponding to "go/went school").

After removing the duplicate sentence, the story generating apparatus proceeds to step 807 and converts the middle sentence into a sentence of a complete form. That is, the story generating apparatus converts the middle sentence into a sentence of a complete form using verb ending information and sentence connection information. In an example where two middle sentences "oneul haggyoeseo/siheomchyeoss/siheomchi" (corresponding to "today, go school and take/took a test") and "Cheol-Suwa/Nongguhaess/Nongguha" (corresponding to "play golf with Cheol-Su") exist and sentence connection information is of combination, the story generating apparatus connects the two middle sentences as one sentence. At this time, the story generating apparatus selects a sentence connective verb ending to connect the two middle sentences using the sentence connective verb ending dictionary of Table 7 above. After that, the story generating apparatus selects an ending verb, generating a complete sentence "oneul haggyoeseo siheomchyeossgo, Cheol-Suwa Nongguhaessda" (corresponding to "today, go school and take/took a test and play golf with Cheol-Su"). At this time, the story generating apparatus can select the ending verb considering at least one of area, gender, and age. In an example where the story generating apparatus sets an ending verb differently by age, the story generating apparatus can select the ending verb using Table 12 above.

After converting the middle sentence into the complete sentence in step 807, the story generating apparatus proceeds to step 417 and displays, on a display unit, the sentence generated by topic such that a user can identify the generated sentence.

As described above, in an example where the story generating apparatus generates a story by topic, the story generating apparatus may generate not only a main topic but also a story related to weather and user's emotion together.

In the aforementioned exemplary embodiment, a mobile device performs all of user information collection, user information analysis, and story generation. At this time, the mobile device can accumulate user information and estimate a user's behavior pattern. According to this, the mobile device can generate a story on the basis of topic information capable of summarizing the user's behavior pattern.

In another exemplary embodiment, the mobile device can collect user information, and an information analysis server can analyze the collected user information, generating a story. For example, the mobile device provides the collected user information to the information analysis server. The information analysis server analyzes the user information provided from the mobile device and generates a story. After that, the information analysis server provides the generated story to the mobile device. The mobile device displays, on a display unit, the story generated in the information analysis server such that a user can identify the story. That is, the information analysis server performs the same operation as the analysis unit 120 and the story generator 130 of FIG. 1. At this time, the information analysis server can accumulate the user information and estimate a user's behavior pattern. According to this, the information analysis server can generate a story on the basis of topic information capable of summarizing the user's behavior pattern.

In a further exemplary embodiment, the mobile device may collect user information, an information analysis server may analyze the user information, and a story generating server may generate a story. For example, the mobile device provides the collected user information to the information analysis server. The information analysis server analyzes the user information provided from the mobile device and provides the analyzed user information to the story generating server. The story generating server generates a story using analysis information about the user information provided from the information analysis server, and provides the generated story to the mobile device. The mobile device displays, on a display unit, the story generated in the information analysis server such that a user can identify the story. That is, the information analysis server performs the same operation as the analysis unit 120 of FIG. 1, and the story generating server performs the same operation as the story generator 130 of FIG. 1. At this time, the information analysis server can accumulate the user information and estimate a user's behavior pattern. According to this, the story generating server can generate a story on the basis of topic information capable of summarizing the user's behavior pattern provided from the information analysis server.

In a yet another exemplary embodiment, the mobile device may perform user information collection and story generation, and an information analysis server may analyze information. For example, the mobile device provides collected user information to the information analysis server. The information analysis server analyzes the user information provided from the mobile device and provides the analyzed user information to the mobile device. The mobile device generates a story using analysis information about the user information provided from the information analysis server, and displays the story on a display unit such that a user can identify the story. That is, the information analysis server performs the same operation as the analysis unit 120 of FIG. 1. At this time, the information analysis server can accumulate the user information and estimate a user's behavior pattern. According to this, the mobile device can generate a story on the basis of topic information capable of summarizing the user's behavior pattern provided from the information analysis server.

In the aforementioned exemplary embodiment, the story generating apparatus chooses a topic related to user daily life information and generates a story. At this time, the story generating apparatus can choose a topic using a topic class list such as Table 14 below.

TABLE 14

| Class | Sub class | Definition of situation |
|---|---|---|
| Included in all topics | Credit card | Details of credit card |
| | Call | Cellular phone call |
| | Letter | Daily letter, SMS of cellular phone, E-mail |
| Life | Religion | Activities related to religion |
| | Finance | Stock investment, activities related to finance |
| | Plan/appointment | Case where making appointment or plan is main work |
| | Housework | Helping or doing work related to family |
| | Diet | Case where work related to diet activity is main work |
| | Pain | Case where going to hospital or curing due to pain is main work |
| | Anniversary | Personal anniversaries occurring in daily life such as Wedding anniversary and the hundredth day |
| | Special holiday | Holidays taking special attribute while being on calendar, such as Christmas, New year, the New year's day, Chuseok |

TABLE 14-continued

| Class | Sub class | Definition of situation |
|---|---|---|
| Personal relations | Personal relations | Activities occurring among family, friends, or employees while not belonging to any other topic |
| Hobbies | Sports | Case of performing for the purpose of enjoying sports not diet purpose, such as football and baseball |
| | Reading | Behavior of borrowing or reading book in library and the like |
| | Fishing | |
| | Music | Activities related to listening to music |
| | Game | Computer game, board game |
| | Picture | Series of activities of drawing or enjoying picture |
| | Photograph | Taking photograph or activities related to photograph |
| | Party | Birthday party, celebration party |
| | Cooking | Behavior of cooking |
| | Pet animal | Behavior of washing pet or playing together |
| | TV viewing | Behavior of watching TV |
| Outdoor activities | Travel | Work in zoo, botanical garden, amusement park and the like, overseas travel, domestic travel |
| | viewing | Play, cinema, viewing, musical, concert |
| | Shopping | Behavior of buying something and window shopping |
| School life | Class | Behavior related to class other than study |
| | Study | Self development, behavior related to study |
| | Athletics meeting | Sports day, athletics meeting |
| | Festival | School festival |
| | Examination | Midterm exam, final exam, pop quiz |
| Presentation Examination, national examination | Presentation | Seminar, lecture, symposium |
| | Examination/ license | Midterm, final exams, various exams, activities related to license acquisition |
| | Entrance examination, employment | Interview in college, activities related to company employment |
| Job | Reception | Reception business related to contract |
| | Conference | Weekly conference, monthly conference, business related conference |
| | Business trip | |
| | Business | Thing daily occurring in work having no relation to topic related to other jobs |

Also, the story generating apparatus can store and analyze log information on the basis of a preset configuration file as in Table 15 below. In table 15, we provide English translation of Korean characters and words in ( ) for reference.

TABLE 15

| Line number | Construction information | Example of construction |
|---|---|---|
| Line 1 | Topic information | Life, class, study, athletics meeting, . . . , picnic, . . . |
| Line 2 | Distance information by topic | 0, 0, 0, 0, . . . , 100, . . . |
| Line 3 | Object name information | PERSON, ORG, DAY, TIME, LOCATION, OBJECT |
| Line 4 . . . Line n | Setting information by log | SMS\tS\t\t0.2\t000010\t010000 일정(iljeong)(corresponding to 'schedule')\tGPS \tG\t1:걷 (geod)(corresponding to 'walk')|산책하 (sanchaegha) (corresponding to 'walk around')|여행하 (yeohaengha)(corresponding to 'travel'):0|100|50000\t0.1\t100100\t100200 통화기록 (tonghwagirog)(corresponding to 'call history'))\tC\t2:통화하 (tonghwaha)(corresponding to 'make a phone call'):20\t0.1\t020000\t100002 |

Configuration information of a GPS constructed using Table 15 above can be constructed as in Table 16 below. In table 16, we provide English translation of Korean characters and words in ( ) for reference.

TABLE 16

| Item | Configuration information | Example of configuration |
|---|---|---|
| Item 1 | Log name | GPS |
| Item 2 | Log code | G |
| Item 3 | Basic verb information | 1:걷 (geod))(corresponding to 'walk')|산책하 (sanchaegha))(corresponding to 'walk around')|여행하 (yeohaengha) (corresponding to 'travel'):0|100|50000 |
| Item 4 | Log weight | 0.1 |
| Item 5 | Log data | 100100\t100200 |
| . . . Item n | Processing method information | |

In Table 16 above, the basic verb information defines a basic verb that is used according to a distance. That is, in an example where the distance is greater than 0 meter (m) and is less than 100 m, the story generating apparatus selects "geodda" (corresponding to "walk") as a basic verb and, in an example where the distance is greater than 100 m and is less than 50 km, the story generating apparatus selects "sanchaekhada" (corresponding to "go around") as a basic verb.

Also, computer readable storage medium storing one or more programs, the one or more programs comprising instructions, which when executed by a portable electronic device with a touch-sensitive display, cause the portable electronic device to perform a method comprising, collecting log information comprising the daily life information from at least one electronic device, analyzing the log information collected and deciding at least one topic representing the daily life information, generating at least one sentence representing the daily life information using the at least one topic decided, and displaying the generated at least one sentence.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, exemplary embodiments of the present disclosure have an advantage of, by constructing user life information as a story according to user information collected through at least one electronic device and providing the story to a user, being capable of allowing the user to easily recognize his/her life information and life pattern.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus configured to summarize daily life information of a user, the apparatus comprising:
    an information collection unit configured to collect log information comprising the daily life information from at least one electronic device;
    an analysis unit configured to analyze the log information collected from the information collection unit and decide at least one topic representing the daily life information;
    a story generator configured to generate at least one sentence representing the daily life information based on at least one of a reference topic representative of the daily life information decided by the analysis unit, weather, and an emotion; and
    a display unit configured to display the at least one sentence generated by the story generator.

2. The apparatus of claim 1, wherein the analysis unit comprises:
    a topic segment constructor configured to construct at least one topic segment comprising at least one candidate topic using the log information collected from the information collection unit;
    an extractor configured to extract a sentence constituent element for constituting a sentence from each topic segment;
    a topic decider configured to decide a topic for each topic segment based on a frequency of occurrence of a topic according to the sentence constituent element extracted in the extractor; and
    an episode decider configured to select one topic segment for a reference time based on the frequency of occurrence of a topic comprised in each topic segment.

3. The apparatus of claim 2, wherein the topic segment constructor is further configured to construct at least one topic segment using any one reference log information among a plurality of log information, map assistant log information to each topic segment based on a time of occurrence of the assistant log information, and construct a base segment using assistant log information mapped to no topic segment,
    wherein the assistant log information represents log information excepting the reference log information among the plurality of log information.

4. The apparatus of claim 2, wherein the extractor comprises an object name recognizer.

5. The apparatus of claim 2, wherein the extractor is further configured to update the frequency of occurrence of a topic for a sentence constituent element extracted from each topic segment.

6. The apparatus of claim 2, wherein the episode decider is further configured to select any one reference topic considering the frequency of occurrence of a topic of a topic segment selected at each reference time.

7. The apparatus of claim 6, wherein, when reference topics of continuous topic segments are the same as each other, the episode decider is further configured to integrate the continuous topic segments comprising the same reference topic into one topic segment.

8. The apparatus of claim 1, wherein the story generator is further configured to construct at least one middle sentence using a sentence constituent element comprised in an episode being set at a reference time, remove a middle sentence of a same meaning, add sentence connective verb ending and ending verb information to the middle sentence, and generate a sentence for the episode.

9. The apparatus of claim 8, wherein the story generator is further configured to set the ending verb considering at least one of gender, area, and age.

10. A method for summarizing daily life information, the method comprising:
    collecting log information comprising the daily life information from at least one electronic device;
    analyzing the log information collected and deciding at least one topic representing the daily life information;
    generating at least one sentence representing the daily life information based on at least one of a reference topic representative of the daily life information decided, weather, and an emotion; and
    displaying the generated at least one sentence.

11. The method of claim 10, wherein deciding the topic comprises:
    constructing at least one topic segment comprising at least one candidate topic using the collected log information;
    extracting a sentence constituent element for constituting a sentence from each topic segment;
    deciding a topic for each topic segment based on a frequency of occurrence of a topic according to the extracted sentence constituent element; and
    selecting one topic segment for a reference time based on the frequency of occurrence of a topic comprised in each topic segment.

12. The method of claim 11, wherein constructing the topic segment comprises:
    constructing at least one topic segment using any one reference log information among a plurality of log information;

mapping assistant log information to each topic segment based on a time of occurrence of the assistant log information, and when assistant log information mapped to no topic segment exists, constructing a base segment using the assistant log information mapped to no topic segment, wherein the assistant log information represents log information excepting the reference log information among the plurality of log information.

13. The method of claim 11, wherein extracting the sentence constituent element comprises:

extracting a sentence constituent element from data of a text form using an object name recognizer.

14. The method of claim 11 further comprising:

after extracting the sentence constituent element, updating the frequency of occurrence of a topic for a sentence constituent element extracted from each topic segment.

15. The method of claim 11, wherein selecting the topic segment comprises:

selecting any one reference topic considering the frequency of occurrence of a topic of a topic segment selected at each reference time.

16. The method of claim 15 further comprising:

after selecting the reference topic, identifying if reference topics of continuous topic segments are the same as each other;

when the reference topics of the continuous topic segments are the same as each other, integrating the continuous topic segments comprising the same reference topic into one topic segment.

17. The method of claim 10, wherein generating the sentence comprises:

constructing at least one middle sentence using a sentence constituent element comprised in an episode being set at a reference time;

removing a middle sentence of a same meaning; and adding sentence connective verb ending and ending verb information to the middle sentence, and generating a sentence for the episode.

18. The method of claim 17, wherein the story generator sets the ending verb considering at least one of gender, area, and age.

19. A portable terminal method for summarizing daily life information, the portable terminal comprising:

a storage unit;

a controller;

one or more modules stored in the storage unit and configured for execution by the processor, the one or more modules including instructions to:

collect log information comprising the daily life information from at least one electronic device;

analyze the log information collected and deciding at least one topic representing the daily life information;

generate at least one topic decided, at least one sentence representing the daily life information based on at least one of a reference topic representative of the daily life information decided, weather, and an emotion; and display the generated at least one sentence.

20. A computer readable storage medium storing one or more programs, the one or more programs comprising instructions, which when executed by a portable electronic device with a touch-sensitive display, cause the portable electronic device to perform a method comprising:

collecting log information comprising the daily life information from at least one electronic device;

analyzing the log information collected and deciding at least one topic representing the daily life information;

generating at least one topic decided, at least one sentence representing the daily life information based on at least one of a reference topic representative of the daily life information decided, weather, and an emotion; and displaying the generated at least one sentence.

* * * * *